Feb. 21, 1939.　　　C. S. BLOCKER　　　2,148,185
AUTOMATIC FISHING REEL
Filed Nov. 13, 1936　　　2 Sheets-Sheet 1
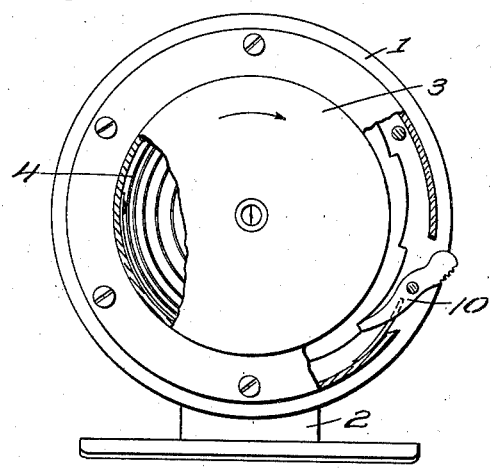
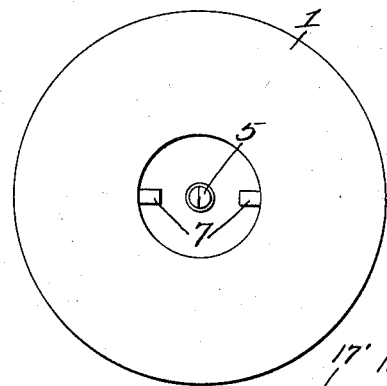
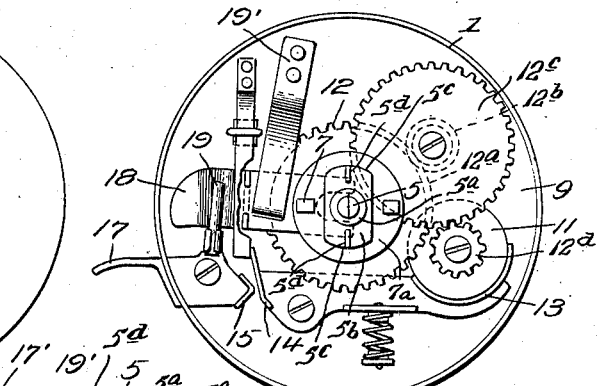
Chauncey S. Blocker
INVENTOR
BY Victor J. Evans & Co.
ATTORNEY Feb. 21, 1939.   C. S. BLOCKER   2,148,185
AUTOMATIC FISHING REEL
Filed Nov. 13, 1936   2 Sheets-Sheet 2

Chauncey S. Blocker,
INVENTOR

BY Victor J. Evans & Co.
ATTORNEY

UNITED STATES PATENT OFFICE 2,148,185

AUTOMATIC FISHING REEL

Chauncey S. Blocker, Columbus, Ohio

Application November 13, 1936, Serial No. 110,762

2 Claims. (Cl. 242—84.3)

This invention relates to automatic fishing reels and has for the primary object the provision of a device of this character which will provide free spool action to relieve the line of tension so that said line may be free to play out as the fish carries the bait prior to swallowing said bait and also permits the line and bait to be cast freely similar to the casting with a conventional casting reel and which when manually released will automatically wind in the line with constant tension on the line until the fish is landed.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a side elevation partly in section illustrating an automatic fishing reel constructed in accordance with my invention.

Figure 2 is an end view illustrating the reel drum and its clutch element.

Figure 3 is a sectional view through the casing of the reel showing the brake mechanism and its connection with the spring driven shaft.

Figure 4 is a fragmentary sectional view showing the brake mechanism in released position.

Figure 5 is a vertical sectional view showing the brake mechanism and its control which also controls the clutch for connecting the reel drum to the spring driven shaft.

Figure 6 is a sectional view taken on the line 6—6 of Figure 5.

Figure 7 is a fragmentary sectional view similar to Figure 6 showing the clutch engaged.

Figure 8 is a detail sectional view illustrating the means of placing a drag on the reel drum.

Figure 9 is a sectional view taken on the line 9—9 of Figure 7.

Referring in detail to the drawings, the numeral 1 indicates a reel housing equipped with a conventional type of mounting 2 for securing said housing on a fishing rod. The housing 1 at one end thereof rotatably supports a spring casing 3 to which is secured one end of a clock type spring 4, the other end of which is secured to an anchoring hub fixed on the end of a drive shaft 5 rotatably supported by the housing 1. Journaled on the shaft 5 is a reel drum 6a, the housing 1 being cut away to expose the drum for the purpose of permitting the fishing line to wind onto and off of the drum. The reel drum is provided with a chamber 6 in which is movable a clutch element 7 and formed on the drum and located within the chamber is a clutch element 8. The clutch element 7 is slidably mounted on a sleeve 5a carried by the shaft 5 which extends centrally through the chamber 6 and into a gear chamber 9 formed in the housing 1. The spring casing 3 has ratchet teeth to be engaged by a spring pressed dog 10 carried by the housing 1. The dog engaging the teeth acts to prevent unwinding of the spring through the rotation of the casing 3 so that said spring will be held tensioned after winding for the purpose of driving the shaft 5.

One end of the sleeve is fashioned with an elongated plate 5b formed with slots on the outer faces 5c in which operate a pair of elongated arms 5d secured to a disk 7a of the clutch element 7. The opposite end of the sleeve 5a has secured thereto a gear 5e operable by a train of gearing hereinafter described.

Journaled in the chamber 9 of the housing 1 is a brake drum 11 and said drum is connected to the shaft 5 by a train of gears 12. Said train of gears 12 comprises a gear 12a, mounted on the shaft 5 meshing with a pinion gear 12b secured to a gear 12c mounted on a stub shaft carried by the housing: the gear 12c meshing with the gear 5e secured to the sleeve and with a gear 12d carried by the brake drum and rotatable therewith. Release of the brake drum, as hereinafter described, permits the gear 12d to rotate therewith. This operation permits gear 12a, secured to the shaft, to rotate gears 12b and 12c. Gear 12c in turn rotates gear 5e on the sleeve 5a which rotates the reel drum, the clutch elements having been previously actuated to engage each other as hereinafter described. A spring pressed pivotally mounted brake shoe 13 is located in the chamber 9 to engage with the drum 11 for the purpose of preventing unwinding of the spring 4. One end of the brake shoe 13 is in the form of a heel 14 engaged by a toe 15 of a pivotally mounted lever 16 having a finger piece 17 extending outwardly of the chamber 9. When the lever 16 is positioned to engage the toe 15 with the heel 14 the brake shoe 13 is forced out of engagement with the drum 11.

A clutch lever 17' is pivotally mounted in the chamber 9 and is connected with the clutch element 7 and is provided with a cam face 18 engaged by an arm 19 carried by the control lever 16 and is also engaged by a spring 19' acting to disengage the clutch. When the control lever 16 is positioned to apply the brake shoe to the brake drum, the arm 19 engages one of the faces to disengage the clutch element 7 from the clutch element 8 thereby freeing the reel drum so that the latter is free to rotate relative to the shaft and permit casting to be done with the reel and to permit the fishing line to play out when the fish strikes the bait and runs therewith prior to swallowing the bait. As soon as the fish swallows the bait the operator actuates the lever 16 engaging the clutch element 7 with the clutch element 8 and disengages the brake shoe from the brake drum. The spring 4 then acts to rotate the reel drum and winds the line thereon until the fish is landed.

A spring arm 20 is located in the chamber 9 of the housing 1 and may be brought to bear against one wall of the reel drum to place a drag on the reel drum. A finger piece 21 is connected with the spring arm whereby the sliding movement thereof in opposite directions will bring about increased and decreased pressure of the spring arm against the reel drum. The pressure of the spring arm is to place sufficient drag on the reel drum to prevent the fishing line from unwinding therefrom when using the reel in strong currents of water or in tide water. The spring arm 20 is fashioned with an offset end section secured to the outer wall of the housing 1 within the chamber 9 and with an intermediate section extending across said housing and terminating in an arcuate end section engaging the face of the reel drum 6a. The finger piece 21 is fashioned with an intermediate section formed with a grooved collar embracing the walls of a slot formed in the wall of the housing and slidable relative thereto. The inner end of the finger piece is fashioned with a depending section engaging the intermediate section of the arm 20 and movement of the finger piece within the slot serves to adjust the arcuate end of the arm relative to the wall of the reel drum.

Having described the invention, I claim:

1. An automatic reel comprising a housing, a spring propelled shaft journaled in said housing, a reel drum journaled on said shaft, a brake drum rotatably mounted in said housing, a train of gears connecting the brake drum to said shaft, a brake shoe engageable with said brake drum and pivotally mounted in said housing, a clutch for connecting and disconnecting the reel drum to the shaft, and a control means connected to said brake shoe and said clutch for effecting operation of the clutch to connect said reel drum to said shaft in advance of the release of the brake shoe from the brake drum whereby upon release of said brake shoe said reel drum is rotated by said shaft.

2. An automatic reel comprising a housing, a spring propelled shaft journaled in said housing, a reel drum journaled on said shaft, a brake drum rotatably mounted in said housing, a train of gears connecting the brake drum to said shaft, a brake shoe engageable with said brake drum and pivotally mounted in said housing, a clutch for connecting and disconnecting the reel drum to the shaft, a control means connected to said brake shoe and said clutch for effecting operation of the clutch to connect said reel drum to said shaft in advance of the release of the brake shoe from the brake drum whereby upon release of said brake shoe said reel drum is rotated by said shaft, and an adjustable spring arm secured to said housing and engageable with said reel drum for varying the drag upon the latter.

CHAUNCEY S. BLOCKER.